June 4, 1968  A. CURRIE  3,386,629
METHOD AND APPARATUS FOR CONTROLLING AND METERING
THE FLOW OF GRANULAR MATERIAL
Filed Feb. 28, 1967
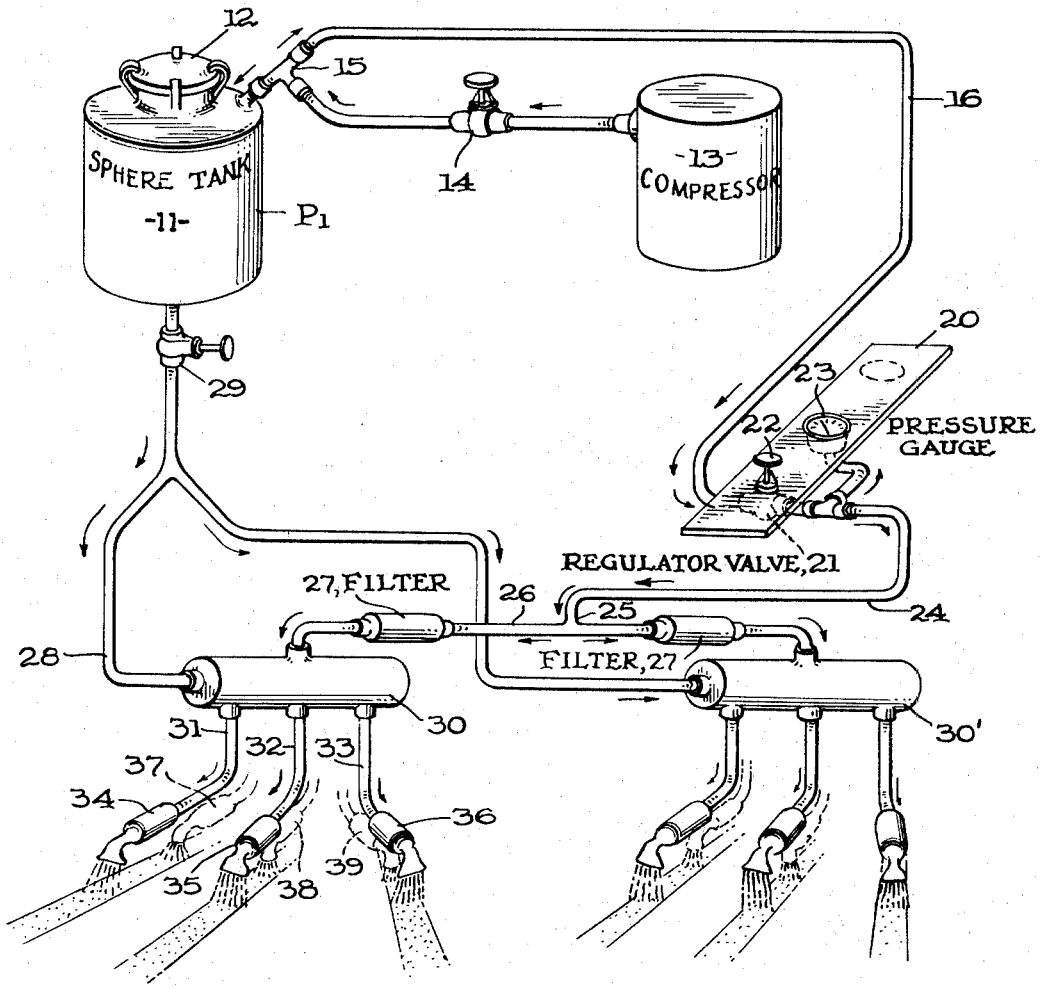
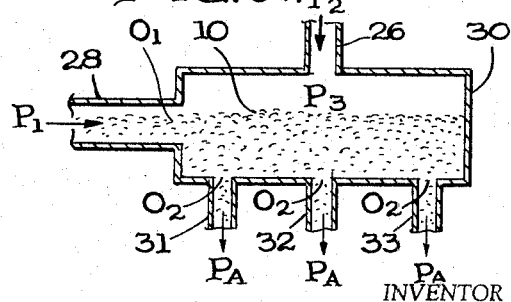
ADAM CURRIE
BY KARL W FLOCKS
ATTORNEY 3,386,629
METHOD AND APPARATUS FOR CONTROLLING
AND METERING THE FLOW OF GRANULAR
MATERIAL
Adam Currie, Huntingdon, Pa., assignor, by mesne assignments, to Wald Industries, Inc., Huntingdon, Pa., a corporation of Pennsylvania
Filed Feb. 28, 1967, Ser. No. 619,358
8 Claims. (Cl. 222—193)

ABSTRACT OF THE DISCLOSURE

A method and connections to apparatus which control and meter the flow of granular material such as glass beads in road striping machinery, wherein the contents of a tank containing the granular material are under pressure and are caused to flow through a supply line of such dimensions that incremental pressure drops are created in said line between the tank and the receiving manifold, the total pressure drop being such that the pressure in the manifold is at or near zero so as to dampen the pulsations generated by the flow of glass spheres in the system.

---

The present invention relates to road striping machinery and more particularly to means and the method for controlling and metering the flow of glass beads which are added to the paint during the process of placing striping on roadways for the aid of traffic control.

When laying granular material in the paint of the stripe on a roadway it is preferable if this material can be added to the paint in a smooth and uniform manner. Uneven amounts of granular material will result in uneven reflection from the road stripe and of course this can result in poor visibility of the stripe along portions of the roadway which may affect the safety of drivers attempting to follow that road.

There have been methods which have been used to obtain an even dispensing of the glass beads but these methods have been shown to have certain disadvantages. Among these disadvantages have been a lack of versatility of the control of the flow of the glass beads thereby severely limiting the truck speed and also limiting a change of flow of the beads necessitated by changes in the speed of the truck, especially when the truck must slow down during the process of spreading the glass beads on the paint stripe. Also prior methods, such as those using the jet pump theory wherein a velocity must be created to produce a negative pressure and control is obtained by variation of this negative pressure by the introduction of a fluid at that point, are wasteful of the compressed air supply. Such systems using a primary flow to induce a secondary flow can only be economical when the end result at discharge utilizes the mixing of the two fluids. In line marking which calls for long periods of operation, the large use of compressed air required for such systems could not be tolerated.

In the method of the present invention the supply container holding the granular material is under pressure from an air supply source such as a compressor. The granular material passes through the supply line to a manifold connected to dispensers which are aligned with paint sprayers on a road striping truck. At the manifold means a regulated supply of air is injected and by this means the flow of the granular material is controlled.

It is an object of the present invention to facilitate the removal of ripples from reflectorized traffic lines placed on the roadways by road striping machinery and allow the operation of the reflectorizing system without incurring pulsations therein and eliminate uneven deposits of the granular material.

Also it is an object of the present invention to allow control of the metering of the flow of granular material such as glass spheres to the roadway so as to deposit the correct amount of granular material to the reflectorized line at any truck speed.

Basically the present invention involves the creation of incremental pressure drops in the supply line of flowing glass spheres or other granular material prior to and up to the manifold such that the pressure in the manifold is at or near zero and introducing a super-imposed pressure, from the original source or another source, to the manifold. This superimposed pressure being regulated by a pressure regulator or fluidic device between limits determined by the amount of the supply pressure and the amount of the supply pressure minus the pressure drop thereby changing the pressure head at the nozzles and obtaining a variety of flow rates. Also by the introduction of a constant super-imposed pressure in the manner described, a constant head at the nozzles is created for a given flow, eliminating the possibility of a fluctuating head.

In general, the method of the present invention and apparatus connected in the manner described has advantages over prior art systems and methods in that a smooth flow of granular material such as glass beads or glass spheres may be dispensed from the flow nozzles or dispensing guns of road striping machinery when these flow nozzles or dispensing guns are aligned with the paint spraying guns used in the road striping process. In addition, the present method is most economical in the use of the compressed air resources of the road striping equipment and allows wider variation and faster variation of flow than may be accomplished with previous types of road striping equipment used in dispensing of glass beads in the paint of the stripes.

These as well as further objects and advantages which are inherent in the invention will become apparent from the following description, reference being made to the accompanying drawings wherein:

FIG. 1 is a partial schematic showing the connections for an embodiment of a system for dispensing glass beads or similar granular material utilizing the method of the present invention; and FIG. 2 is a diagrammatic showing of the manifold means of FIG. 1.

Referring first to FIG. 1, there is shown in a partially schematic view an embodiment of the system for the smooth dispensing of granular material in accordance with the method of the present invention. A tank 11 holds a supply of granular material, which is usually glass spheres or beads, with a lid 12 thereon through which the supply of beads in tank 11 may be replenished. With lid 12 in position the tank 11 should be airtight in order to maintain the pressure of air from compressor 13 which flows through regulator 14 located in the path between compressor 13 and tank 11. In this path to tank 11 there is located a Y connection 15 from which air is supplied to tank 11 and to the control panel board 20. Located at control board 20 there is a regulator valve 21 which may be controlled manually by knob 22 also a pressure gauge 23 which is used to judge the manipulation of the control knob 22. The air flow from Y connection 15 passes through hose connection 16 is regulated by valve 21 and flows through hose 24 to Y connection 25. At Y connection 25 the flow of air is separated so as to pass in equal amounts to the left and right carriages of the road striping material, specifically to the sphere manifolds 30 and 30'.

It should be noted that the plumbing or hose connections into and out of manifolds 30 and 30' are identical and the operation at this point in the system will be the same for both. The air flow through control line 26, which is the air passing through regulator valve 21 and apportioned to line 26 through Y connection 25, passes through a filter 27 into manifold 30. At the same time the granular material, which may be glass spheres or glass beads in a fluid viscous form, passes through supply hose 28, which may have a valve 29 in the line merely for shut off purposes, into manifold 30. Hose connections 31, 32 and 33 are connected to manifold 30 and pass the granular material therethrough to flow nozzles or dispensing guns 34, 35 and 36 respectively which have been so aligned with the paint spray guns 37, 38 and 39 on the road striping machinery so as to place the glass spheres or glass beads or other granular material on the freshly painted road stripes laid by the paint spray guns.

It should be noted that although the embodiment in FIG. 1 discloses a manual means for operating the regulator valve in the control line to the manifold this regulation could take place by electronic means connected in conjunction with a pressure gauge and with the speedometer indication of the truck carrying the road striping machinery.

FIG. 2 illustrates in diagrammatic form the manifold 30 or 30' having inlets such as control line 26 and supply line 28 and outlets 31, 32 and 33 for dispensing hoses which connect to the respective flow nozzles or dispensing guns 34, 35 and 36 as shown in FIG. 1. In order to explain the operation of the device there is shown on FIG. 2 glass spheres 10 which have been delivered to manifold 30 from tank 11, under pressure, through line 28, the diameter and length of this line being such that the total pressure drop in said line will result in zero or near zero pressure $P_2$ in the manifold when no injection air is being admitted.

Glass beads flowing in a conduit do friction work hence incremental pressure drops are established along the line 28.

When the regulated injection flow is introduced into the manifold the pressure $P_2$ in the manifold will increase as the injection flow is increased provided the area of the discharge nozzles remain constant. Manifold pressure $P_2$ will then act as a counter pressure to the tank pressure and as this counter pressure is increased it will gradually eliminate the incremental pressure drops in the line 28 until the pressure in the manifold reaches 80% of the pressure in the tank at which point instability occurs and quite suddenly the pressure in the manifold becomes equal to the pressure in the tank with severe pulsations prevalent. While the pressure in the manifold is 80% or less of the tank pressure the system meters glass spheres to the stripe line through the fixed orifices or nozzles without pulsations, the amount of flow being a function of the manifold pressure $P_2$. The amount of injection air required to build up the necessary pressures in the manifold will be a function of the total area of the nozzles or orifices and the primary flow of material.

Such a system using a control pressure $P_2$ is advantageous and can accomplish more than merely varying the pressure $P_1$. Consider a pressurized closed vessel such as manifold 30 filled with granular material 10 then it is apparent that it is easy to increase the pressure in manifold 30 by variation of pressure $P_1$ but it is not so easy to decrease the pressure in manifold 30. In order to decrease the pressure therein it would be necessary to blow down the vessel to the pressure desired. This would entail a loss of compressed air and an unwieldy system to operate. With the continued operation of the system as is necessary with road striping equipment and variations in pressure required such loss of compressed air would be great and would be uneconomical and very inefficient in the continued operation of the system.

It will be obvious to those skilled in the art that various changes may be made without departing from the scope of the invention and the invention is not to be considered limited to what is shown in the drawings and described in the specification.

What is claimed is:

1. A system for metering and dispensing granular material without pulsations on a line stripe in conjunction with the painting of said line stripe with road striping machinery comprising
    container means,
    pressurized tank supply means to supply granular material to said container means connected thereto,
    means for creating pressure in said supply means connected thereto,
    dispensing means for receiving said granular material from said container means connected thereto and dispensing said granular material on said line stripe without pulsations with the amount of flow through said dispensing means being a function of the pressure in said container means,
    means for injecting air into said container means connected thereto to create pressure in said container means counter to pressure from said pressurized tank supply means,
    and means for varying the flow of injection air into said container means to change the pressure in said supply means over a range of pressure up to a pressure at a predetermined percentage value of the pressure of said pressurized tank supply means,
    whereby the flow through said dispensing means is a function of the pressure in said container means.

2. The system of claim 1 further characterized by
    said means for varying the flow of injection air into said container means operating to change the pressure in said container means between the limits of zero pressure and a pressure at a predetermined percentage value of the pressure of said pressurized tank supply means.

3. The system of claim 1 further characterized by
    said granular material being reflecting glass spheres.

4. The system of claim 1 further characterized by
    said dispensing means including a dispensing gun on the opposite end of said dispensing means from its connection to said container means,
    and paint spraying means mounted on road striping machinery in alignment with said dispensing gun in a position forward of said dispensing gun in the direction of movement of said road striping machinery during operation thereof.

5. The system of claim 2 further characterized by
    said predetermined percentage value of the pressure being approximately 80 percent of the pressure of said pressurized tank supply means.

6. A method of metering and dispensing granular material without pulsations onto a line stripe in conjunction with the painting of said line stripe with road striping machinery which comprises
    supplying flowing granular material under pressure in a line having pressure drops therein;
    injecting a fluid under regulated pressure into said line so as to create a pressure in the line counter to the pressure on said granular material from its supply source;
    regulating the pressure at the place of injection of said fluid under regulated pressure over a range of pressure up to a pressure at a predetermined percentage value of the pressure on the granular material from its supply source.

7. The method of claim 6, further characterized by regulating the pressure at the place of injection between the limits of zero pressure and a pressure at a predetermined percentage value of the pressure on the granular material from its supply source.

8. The method of claim 6, further characterized by supplying the fluid pressure on said flowing granular material and the injection fluid pressure from a common source.

References Cited
UNITED STATES PATENTS

| | | | |
|---|---|---|---|
| 2,833,542 | 5/1958 | Martin | 222—176 |
| 2,891,782 | 6/1959 | Blackman et al. | 302—53 X |
| 3,094,249 | 6/1963 | Pullen | 222—193 |

STANLEY H. TOLLBERG, *Primary Examiner.*